(12) United States Patent
Rajkotia et al.

(10) Patent No.: US 7,570,961 B2
(45) Date of Patent: *Aug. 4, 2009

(54) APPARATUS AND METHOD FOR REACTIVATING MULTIPLE PACKET DATA SESSIONS IN A WIRELESS NETWORK

(75) Inventors: Purva R. Rajkotia, Plano, TX (US); William J. Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

This patent is subject to a terminal disclaimer.

(21) Appl. No.: 11/496,751

(22) Filed: Aug. 1, 2006

(65) Prior Publication Data

US 2006/0270428 A1 Nov. 30, 2006

Related U.S. Application Data

(63) Continuation of application No. 10/659,907, filed on Sep. 11, 2003, now Pat. No. 7,133,674.

(60) Provisional application No. 60/495,311, filed on Aug. 15, 2003.

(51) Int. Cl.
*H04Q 7/20* (2006.01)

(52) U.S. Cl. ............... 455/456.2; 455/517; 455/439; 370/350

(58) Field of Classification Search .......... 455/517, 455/436, 437, 438, 439, 422, 456.2, 70, 433, 455/434, 410, 519, 67.11, 115.1, 509, 574; 370/329, 331, 338, 401, 305
See application file for complete search history.

(56) References Cited

U.S. PATENT DOCUMENTS

| | | | |
|---|---|---|---|
| 2001/0038626 A1 * | 11/2001 | Dynarski et al. | 370/356 |
| 2002/0141361 A1 * | 10/2002 | Madour et al. | 370/331 |
| 2003/0152049 A1 * | 8/2003 | Turner | 370/331 |
| 2003/0232629 A1 * | 12/2003 | Jang et al. | 455/552.1 |
| 2004/0062227 A1 * | 4/2004 | Sayeedi | 370/350 |
| 2004/0063431 A1 | 4/2004 | Julka et al. | |
| 2004/0120277 A1 | 6/2004 | Holur et al. | |
| 2004/0185856 A1 * | 9/2004 | McKenna et al. | 455/445 |
| 2004/0203802 A1 * | 10/2004 | McCormick et al. | 455/445 |
| 2005/0003798 A1 | 1/2005 | Jones et al. | |
| 2005/0043026 A1 | 2/2005 | Brok et al. | |
| 2005/0136708 A1 * | 6/2005 | Shimoda et al. | 439/76.2 |
| 2006/0104211 A1 * | 5/2006 | Islam et al. | 370/252 |

* cited by examiner

*Primary Examiner*—Tan Trinh

(57) ABSTRACT

A mobile station capable of reactivating at least a dormant first data session and a dormant second data session associated with a first base station of a wireless network. The mobile station transmits to the first base station an Origination message comprising: i) a first Data Ready to Send (DRS) field indicating to the first base station that the dormant first data session is being reactivated; and ii) a second Data Ready to Send (DRS) field indicating that the dormant second data session is being reactivated.

20 Claims, 4 Drawing Sheets

APPARATUS AND METHOD FOR REACTIVATING MULTIPLE PACKET DATA SESSIONS IN A WIRELESS NETWORK

CROSS-REFERENCE TO OTHER APPLICATION

This application is a continuation of prior U.S. patent application Ser. No. 10/659,907 now U.S. Pat. No. 7,133,674 filed on Sep. 11, 2003 which claims benefit of 60/495,311 filed Aug. 15, 2003.

TECHNICAL FIELD OF THE INVENTION

The present invention relates to wireless communication systems and, more specifically, to an apparatus and method for reactivating multiple packet data sessions in a wireless network.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually create new markets for wireless devices and to expand existing markets by making wireless devices and services cheaper and more reliable. The price of wireless devices has decreased to the point where these devices are affordable to nearly everyone and the price of a wireless device is only a small part of the total cost to the user (i.e., subscriber). To continue to attract new customers, wireless service providers are implementing new services, especially digital data services that enable a user to browse the Internet and to send and receive e-mail.

However, addition of digital data services to a wireless network greatly increases the message traffic flowing between base stations and wireless terminals (i.e., cell phone, wireless laptop, fixed terminal, and the like). This is particularly true for the overhead channels (e.g., paging, common control channels). For example, if a subscriber operating a wireless laptop opens an e-mail application, a browser application, and a VPN connection to a remote server, a different set of control messages are transmitted between the base station and the wireless terminal (i.e., laptop) for each data session. This problem is exacerbated if the subscriber moves from the coverage area of an original base station into the coverage area of a new target base station. If one or more of the data sessions have been dormant (i.e., no traffic channel in use) for a period of time when the hand-off occurs, the dormant data sessions may be dropped during the hand-off unless a separate set of control messages are used to cause the hand-off of each data session from the original base station to the target base station.

For example, under current code division multiple access (CDMA) signaling procedures, each service instance (i.e., data session) must be re-activated separately as part of a hand-off. A CDMA mobile station (or other wireless-terminal) achieves this by sending an Origination message from the mobile station to the network base station. Thus, the mobile station must transmit either multiple Origination messages or multiple Enhanced Origination messages. Sending multiple instances of an Origination message or an Enhanced Origination message (EOM) causes unnecessary loading of the air interface and may cause delay in the handoff of multiple service instances. This is not an efficient way to re-activate multiple service instances.

Therefore, there is a need for wireless communication devices that are capable of re-activating multiple data sessions in an efficient manner. In particular, there is a need for an improved base station and an improved mobile station that can efficiently re-activate multiple dormant data sessions with a minimum amount of control channel messages.

SUMMARY OF THE INVENTION

The present invention provides an efficient method for a wireless terminal to re-activate multiple packet data sessions. The base station and the wireless terminal (e.g., mobile station) accomplish this using enhanced air interface and network signaling to accommodate the re-activation. The present invention may be implemented in both the base station and the mobile station by modifying the software of conventional CDMA base stations and mobile stations that communicate according to the TIA/EIA/IS-2000-C standards. The software modifications affect the format and order of control messages transmitted between the base station and the mobile station.

To address the above-discussed deficiencies of the prior art, it is a primary object of the present invention to provide a mobile station capable of establishing a plurality of data sessions with a first base station of a wireless network. According to an advantageous embodiment of the present invention, the mobile station is capable of reactivating at least a dormant first data session and a dormant second data session by transmitting to the first base station an Origination message. The Origination message comprises: i) a first Data Ready to Send (DRS) field indicating to the first base station that the dormant first data session is being reactivated; and ii) a second Data Ready to Send (DRS) field indicating that the dormant second data session is being reactivated.

According to one embodiment of the present invention, the mobile station transmits the Origination message in response to a user input to an application associated with the dormant first data session.

According to another embodiment of the present invention, the mobile station transmits the Origination message in response to a determination that the mobile station is about to enter a handoff procedure from the first base station to a second base station and maintains dormant packet data sessions.

According to still another embodiment of the present invention, the mobile station is further capable of simultaneously assigning the first data session and the second data session to at least a first traffic channel after the first and second data sessions are reactivated.

It is another primary object of the present invention to provide, for use in a wireless network, a base station capable of reactivating at least a dormant first data session and a dormant second data session associated with a first mobile station in a coverage area of the wireless network. According to an advantageous embodiment of the present invention, the base station receives from the first mobile station an Origination message comprising: i) a first Data Ready to Send (DRS) field indicating that the dormant first data session is being reactivated; and ii) a second Data Ready to Send (DRS) field indicating that the dormant second data session is being reactivated. In response to the Origination message, the base station simultaneously assigns the first data session and the second data session to at least a first traffic channel after the first and second data sessions are reactivated.

According to further embodiment of the present invention, the base station, in response to the Origination message, is further capable of simultaneously establishing a first connection and a second connection to a packet control function unit, wherein the first connection is associated with the reactivated first data session and second connection is associated with the reactivated second data session.

The foregoing has outlined rather broadly several features of this disclosure so that those skilled in the art may better understand the Detailed Description of the Invention that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications network.

Figure 1:
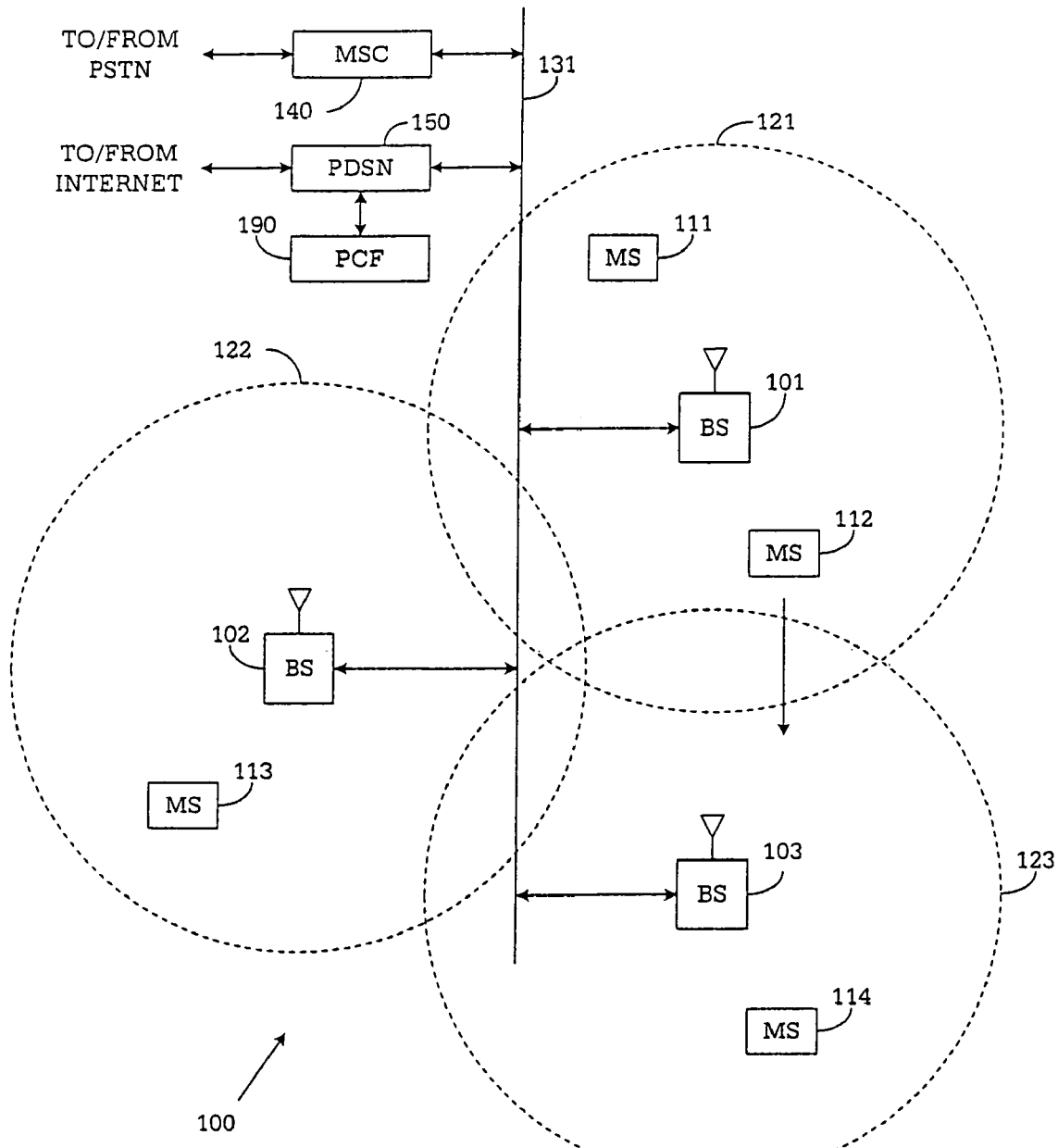
FIG. 1 illustrates an exemplary wireless network that performs multiple service reactivations according to the principles of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels. Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the is present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known to those skilled in the art, a mobile station that maintains dormant packet data sessions initiates a "dormant handoff" of those packet data sessions when it moves to a coverage area (or "packet zone") that is controlled by another base station controller (BSC). In such an event, the mobile station alerts the network of its new situation, so that a connection from PDSN 150 to the wireless network may be moved to the proper PCF 150.

As MS 112 moves from cell 121 to cell 123, MS 112 detects that the packet zone has changed and initiates a dormant handoff as described in TIA/EIA/IS-2000. During this procedure, the mobile station and the base station may or may not establish a new CDMA channel.

At the time of hand-off, there may be a plurality of dormant data session open on MS 112. The present invention provides a mechanism that enables MS 112 and BS 101 to reactivate all of the dormant data sessions so that traffic channel resources may be allocated to the data sessions during the hand-off. The present invention also operates even if a hand-off is not about to occur. For example, if a user (subscriber) opens an e-mail application, a browser application, and a VPN connection and is then distracted for a period of time (e.g., answer the phone, have dinner), all of the data sessions may become dormant, so that no traffic channel is allocated for the data session. When the user returns and selects one of the applications (e.g., sends an e-mail), the present invention is operable to reactivate all of the applications, not merely the selected application.

When the mobile station comes out of dormancy (a packet data service instance is reactivated), the mobile station sends a new type of Origination message. The new Origination message indicates which packet data service session (or instance) is being re-activated and also lists the other dormant packet data services currently being maintained at the mobile. A Service Reference ID (SR_ID) identifies each session. The SR_ID value is unique for each service the mobile is maintaining. According to the principles of the present invention, the mobile station also adds a Data Ready to Send (DRS) field (e.g., one bit) for every instance of the SR_ID records. This enables mobile station 112 to use a single Origination message to signal to wireless network 100 that more than one service instance is being reactivated. Thus, it is not necessary to send multiple signaling messages (one for each re-activating service session).

Figure 2:
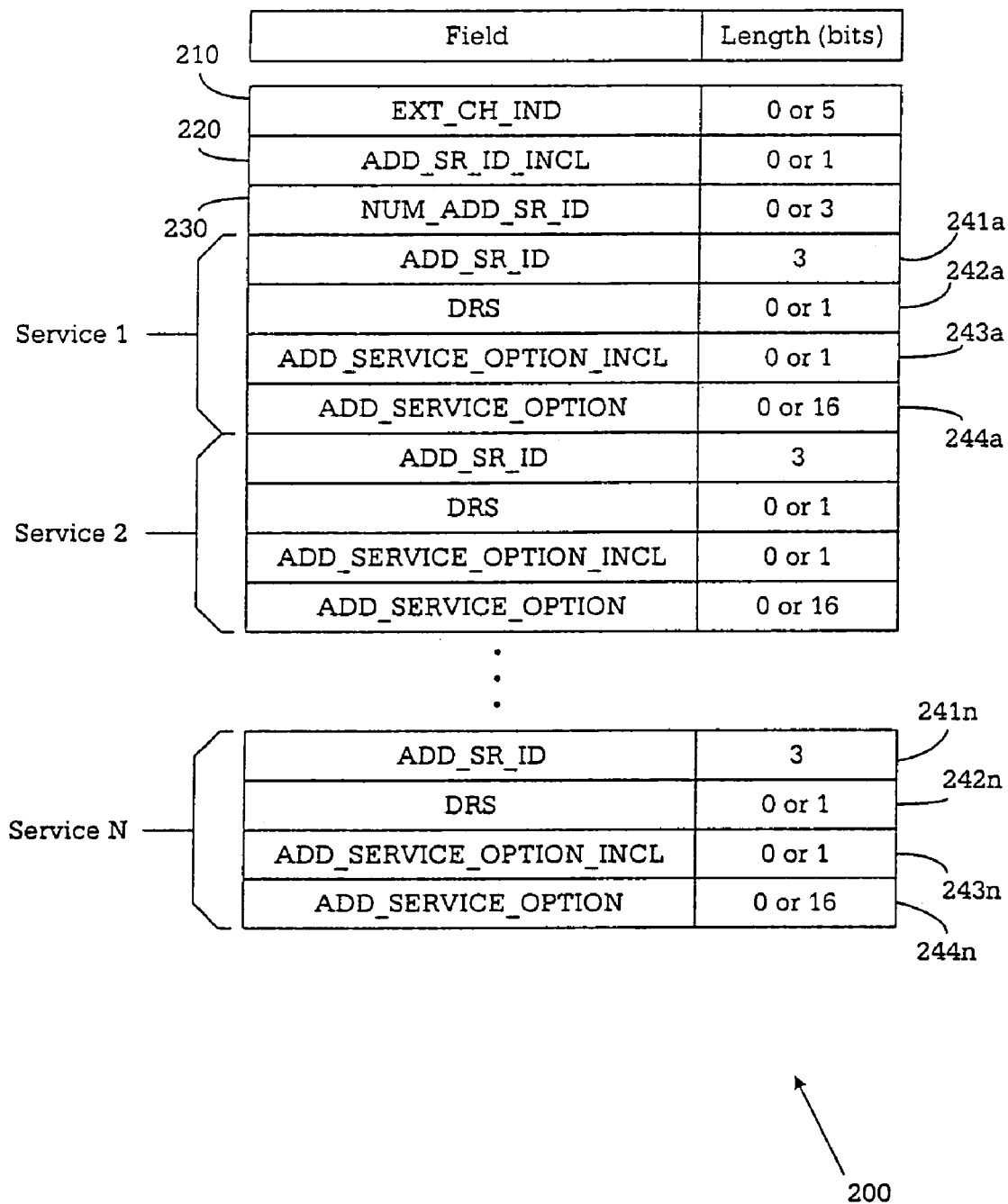
FIG. 2 illustrates a modified Origination message that enables multiple service reactivation operations according to the principles of the present invention.

FIG. 2 illustrates elected portions of modified Origination message 200, which enables multiple service reactivation operations according to the principles of the present invention. In the exemplary embodiment, N data service sessions (or instances) are open, but dormant, on mobile station 112. Origination message 200 comprises, in part, EXT_CH_IND field 210, ADD_SR_ID_INCL field 220, and NUM_ADD_SR_ID field 230. Also, for each of the N open data sessions, Origination message 200 comprises ADD_SR_ID field 241, DRS field 242, ADD_SERVICE_OPTION_INCL field 243, and ADD_SERVICE_OPTION field 243.

For example, for Service 1 (e.g., e-mail), Origination message 200 comprises ADD_SR_ID field 241a, DRS field 242a, ADD_SERVICE_OPTION_INCL field 243a, and ADD_SERVICE_OPTION field 243a. For Service N (e.g., browser), Origination message 200 comprises ADD_SR_ID field 241n, DRS field 242n, ADD_SERVICE_OPTION_INCL field 243n, and ADD_SERVICE_OPTION field 243n. DRS field 242 is a "Data Ready to Send" indicator. MS 112 sets this field to Logic 1 if MS 112 requests a packet data service option and has data to send. Otherwise, mobile station 112 set this field to Logic 0.

The following message flow diagrams illustrate the differences between existing signaling methods and the proposed signaling methods when reactivating multiple packet data service instances. For simplicity, it is assumed that MS 111 only has two service instances (i.e., data sessions) that are being re-activated.

Figure 3:
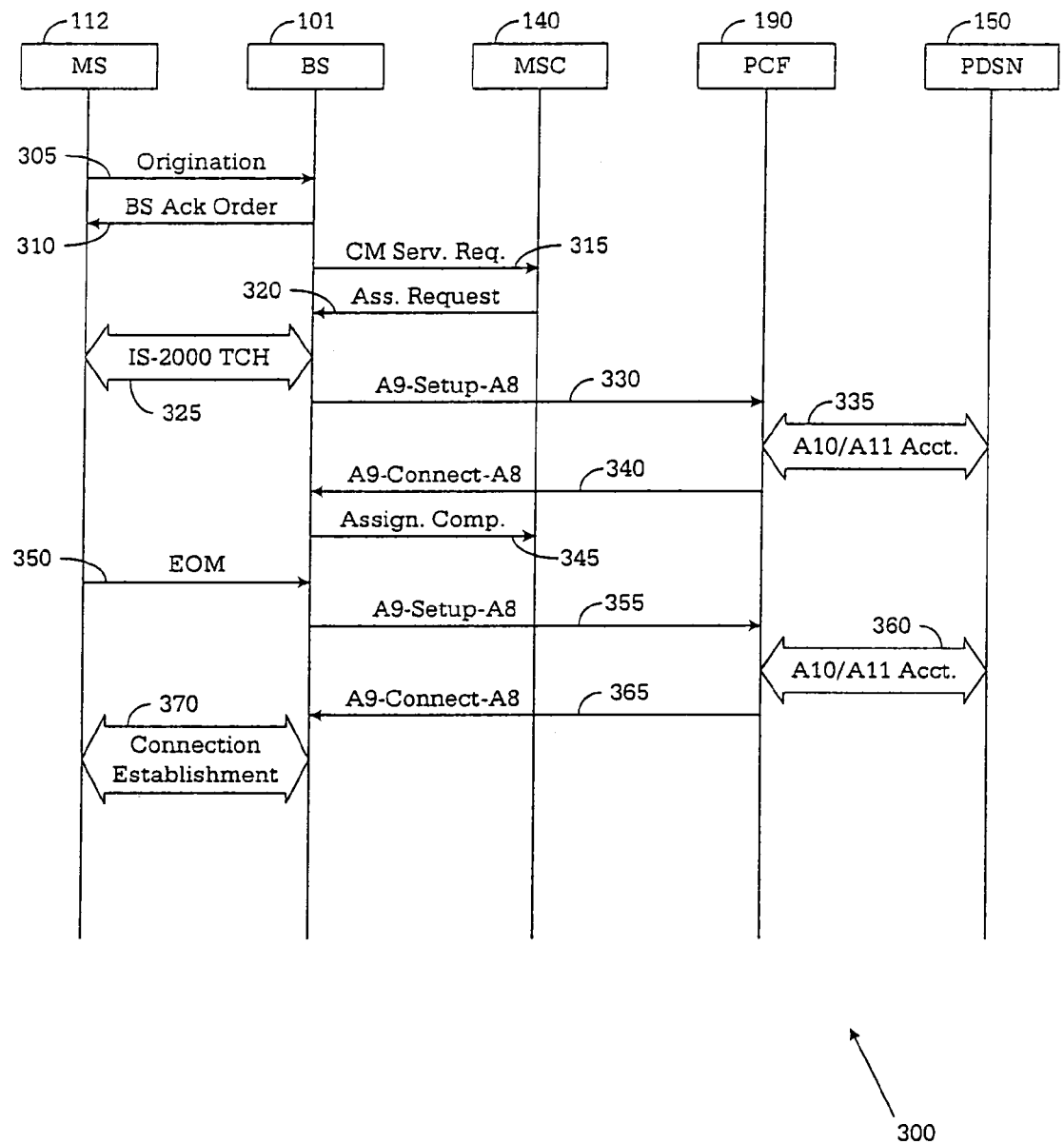
FIG. 3 illustrates an exemplary base station and an exemplary base transceiver station according to one embodiment of the prior art.

FIG. 3 depicts message flow diagram 300, which illustrates a multiple service reactivation operation according to the prior art. Initially, MS 112 transmits Origination message 305 to BS 101 indicating that a service instance is reactivating. BS 101 acknowledges receipt by transmitting BS Acknowledgment Order message 310. BS 101 also sends CM Service Request message 315 to MSC 140 to authenticate MS 112. MSC 140 authenticates MS 112 and sends Assignment Request message 320 to BS 101, indicating that radio resources (i.e., a traffic channel) may be assigned to MS 112. Thereafter, MS 112 and BS 101 assign the traffic channel and reconnect the first data session (or service instance), as indicated by IS-2000 Traffic Channel (TCH) message flows 325.

Next, BS 101 sends A9-Setup-A8 message 330 to establish an A8 interface connection to packet control function (PCF) unit 190. PCF unit 190 exchanges accounting information with PDSN 150, indicating that MS 112 is on a traffic channel, as indicated by A10/A11 Accounting message flows 335. PCF unit 190 transmits A9-Connect-A8 message 340 to BS 101, completing the setup of the A8 channel between BS 101 and PCF unit 190 for the first service instance. BS 101 transmits Assignment Complete message 345 to MSC 140, indicating that the service has been successfully re-established.

Next, MS 112 sends Enhanced Origination message (EOM) 350 on the traffic-channel to begin reactivation of the second service instance. BS 101 sends A9-Setup-A8 message 355 to PCF unit 190 to request establishment of an A8 channel between BS 101 and PCF unit 190 for the second service instance (second data session). PCF unit 190 sends accounting information to PDSN 150 indicating that a second service has been connected, as indicated by A10/A11 Accounting message flows 360. PCF unit 190 then sends A9-Connect-A8 message 365 to BS 101, completing the setup of the A8 channel between BS 101 and PCF unit 190 for the second service instance. Finally, BS 101 and MS 112 connect the second service instance over the traffic channel, as indicated by Connection Establishment message flows 370. At this point, both service instances are re-connected.

Figure 4:
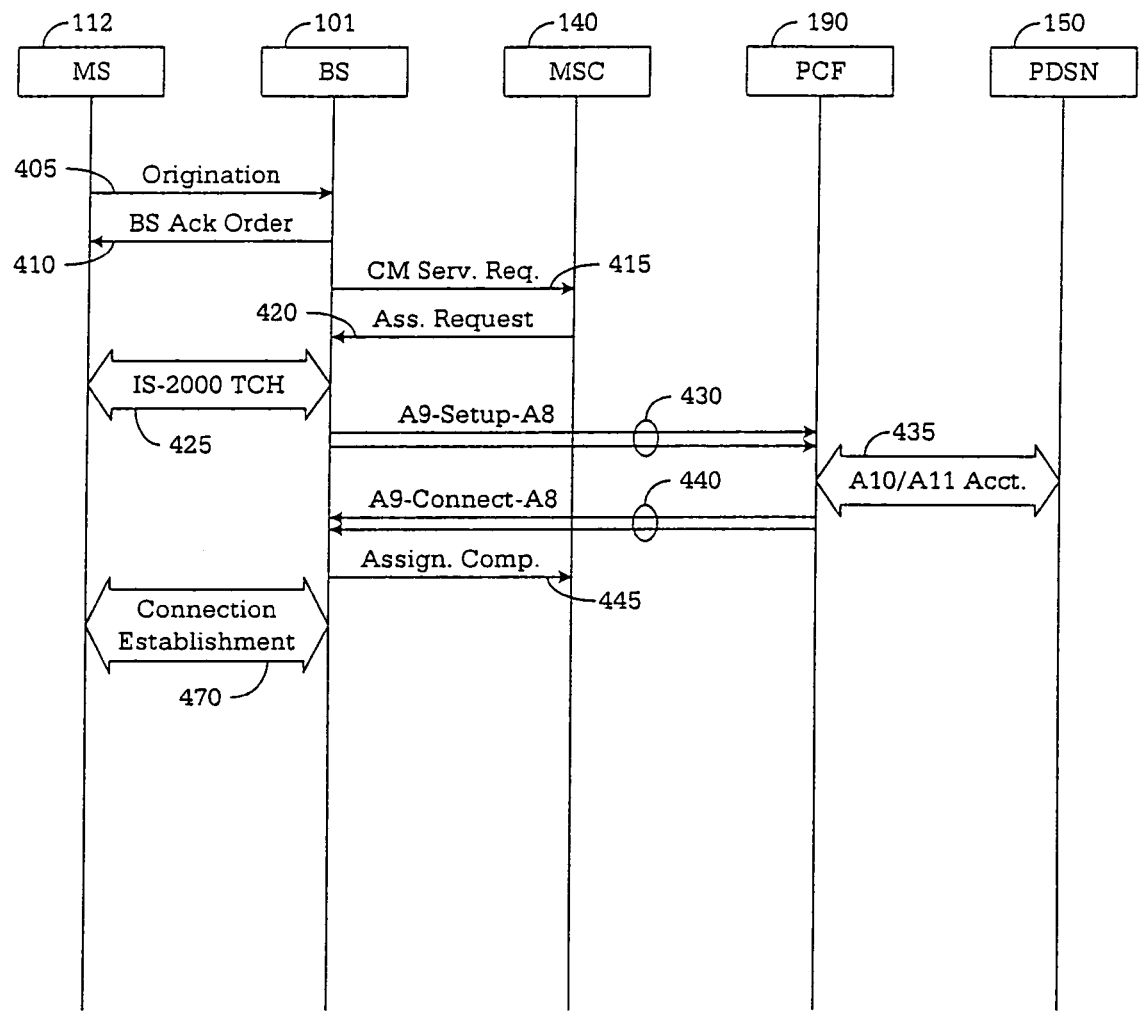
FIG. 4 is a message flow diagram illustrating a multiple service reactivation operation according to the principles of the present invention.

FIG. 4 depicts message flow diagram 400, which illustrates a multiple service reactivation operation according to the principles of the present invention. Initially, MS 112 transmits new Origination message 405 to BS 101 indicating that a service instance is re-activating. Origination message 405, which is similar to Origination message 200 in FIG. 2, also indicates that a second service instance also is reactivating.

BS 101 acknowledges receipt by transmitting BS Acknowledgment Order message 410. BS 101 also sends CM Service Request message 415 to MSC 140 to authenticate MS 112. MSC 140 authenticates MS 112 and sends Assignment Request message 420 to BS 101, indicating that radio resources (i.e., a traffic channel) may be assigned to MS 112. Thereafter, MS 112 and BS 101 assign the traffic channel and reconnect both data sessions (service instances), as indicated by IS-2000 Traffic Channel (TCH) message flows 425.

Next, BS 101 sends two A9-Setup-A8 messages 430 to establish an A8 connection to PCF unit 190 for both service instances. These independent connections are established simultaneously. PCF unit 190 sends accounting information to PDSN 150, indicating that MS 112 has been placed on a traffic channel, as indicated by A10/A11 Accounting message flows 435.

PCF unit 190 then sends two A9-Connect-A8 messages 440 to BS 101, completing the setup of the A8 channels between BS 101 and PCF unit 190 for the service instances. Since these are independent operations, both connections may be established simultaneously. BS 101 sends Assignment Complete message 445 to MSC 140. At this point, both services are re-established, as indicated by Connection Establishment message flows 470.

The present invention allows multiple service instance transmissions at the same time with a single Origination message. This reduces air interface loading by providing an efficient way to invoke the multiple service instances. The present invention also reduces delay when re-activating multiple service instances.

By adding a one-bit field (DRS field 242) to Origination Message 200, the present invention avoids extra messaging and delay. The proposed invention reduce this overhead by allowing the mobile station to indicate immediately that it has multiple service instances that will be reactivated, thereby allowing parallel network connection setups. This is an improvement over the existing method, which only allows serial connection setup.

Although the present invention has been described in detail, those skilled in the art should understand that they may make various changes, substitutions and alterations herein without departing from the spirit and scope of the invention in its broadest form.

What is claimed is:

1. A mobile station capable of establishing a plurality of data sessions with a first base station of a wireless network, wherein said mobile station is capable of reactivating at least a dormant first data session and a dormant second data session by transmitting to said first base station a control message, said control message comprising:

a first data field indicating to said first base station that said dormant first data session is being reactivated; and a second data field indicating that said dormant second data session is being reactivated.

2. The mobile station as set forth in claim 1, wherein said mobile station transmits said control message in response to a user input to a first application associated with said dormant first data session.

3. The mobile station as set forth in claim 1, wherein said mobile station transmits said control message in response to a determination that said mobile station is about to enter a handoff procedure from said first base station to a second base station.

4. The mobile station as set forth in claim 1, wherein said mobile station is further capable of assigning said first data session and said second data session to at least a first traffic channel after said first and second data sessions are reactivated.

5. The mobile station as set forth in claim 4, wherein said mobile station simultaneously assigns said first data session and said second data session to said at least a first traffic channel.

6. For use in a mobile station capable of establishing a plurality of data sessions with a first base station of a wireless network, a method of reactivating at least a dormant first data session and a dormant second data session, the method comprising the step of:

transmitting to the first base station a control message comprising: i) a first data field indicating to the first base station that the dormant first data session is being reactivated; and ii) a second data field indicating that the dormant second data session is being reactivated.

7. The method as set forth in claim 6, wherein the step of transmitting the control message occurs in response to a user input to a first application associated with the dormant first data session.

8. The method as set forth in claim 6, wherein the step of transmitting the control message occurs in response to a determination that the mobile station is about to enter a handoff procedure from the first base station to a second base station.

9. The method as set forth in claim 6, further comprising the steps of:

assigning the first data session to at least a first traffic channel after the first and second data sessions are reactivated; and assigning the second data session to the at least a first traffic channel after the first and second data sessions are reactivated.

10. The method as set forth in claim 9, further comprising the steps of assigning the first data session and assigning the second data session are performed simultaneously.

11. For use in a wireless network, a base station capable of reactivating at least a dormant first data session and a dormant second data session associated with a first mobile station in a coverage area of said wireless network, wherein said base station receives from said first mobile station a control message comprising: i) a first data field indicating that said dormant first data session is being reactivated; and ii) a second data field indicating that said dormant second data session is being reactivated, and wherein, in response to said control message, said base station assigns said first data session and said second data session to at least a first traffic channel after said first and second data sessions are reactivated.

12. The base station as set forth in claim 11, wherein said base station simultaneously assigns said first data session and said second data session to said at least a first traffic channel.

13. The base station as set forth in claim 11, wherein said base station, in response to said control message, is further capable of authenticating said mobile station with a mobile switching center, wherein said first data session and said second data session are assigned to said at least a first traffic channel only in response to successful authorization of the mobile station with the mobile switching center.

14. The base station as set forth in claim 11, wherein said base station, in response to said control message, is further capable of establishing a first connection and a second connection to a packet control function unit, wherein said first connection is associated with said reactivated first data session and second connection is associated with said reactivated second data session.

15. The base station as set forth in claim 14, wherein said base station simultaneously establishes said first connection and said second connection to said packet control function unit.

16. For use in a base station of a wireless network, a method of reactivating at least a dormant first data session and a dormant second data session associated with a first mobile station in a coverage area of the wireless network, the method comprising the steps of:
receiving from the first mobile station a control message comprising: i) a first data field indicating that the dormant first data session is being reactivated; and ii) a second data field indicating that the dormant second data session is being reactivated;
in response to the control message, assigning the first data session to at least a first traffic channel after the first and second data sessions are reactivated; and
in response to the control message, assigning the second data session to the at least a first traffic channel after the first and second data sessions are reactivated.

17. The method as set forth in claim 16, wherein the step of assigning the first data session and the step of assigning the second data session are performed simultaneously.

18. The method as set forth in claim 16, further comprising the step, in response to the control message, of:
authorizing the mobile station with a mobile switching center, wherein the steps of assigning the first data session to the at least a first traffic channel and assigning the second data session to the at least a first traffic channel are performed only in response to successful authorization of the mobile station with the mobile switching center.

19. The method as set forth in claim 16, further comprising the step, in response to the control message, of:
establishing a first connection and a second connection to a packet control function unit, wherein the first connection is associated with the reactivated first data session and second connection is associated with the reactivated second data session.

20. The method as set forth in claim 19, wherein the first connection and the second connection to the packet control function unit are established simultaneously.

* * * * *